United States Patent [19]

Lin et al.

[11] Patent Number: 4,920,428
[45] Date of Patent: Apr. 24, 1990

[54] OFFSET, GAIN AND BAD PIXEL CORRECTION IN ELECTRONIC SCANNING ARRAYS

[75] Inventors: Ying-wei Lin, Penfield; Anthony F. Calarco, Fairport, both of N.Y.

[73] Assignee: Xerox Corporation, Stamford, Conn.

[21] Appl. No.: 216,475

[22] Filed: Jul. 8, 1988

[51] Int. Cl.$^5$ ............................................. H04N 1/40
[52] U.S. Cl. .................................... 358/461; 358/163; 358/213.15; 358/213.16; 358/213.17; 358/213.18
[58] Field of Search ............... 358/163, 443, 448, 461, 358/471, 474, 482, 494, 213.15, 213.16, 213.17, 213.18

[56] References Cited

U.S. PATENT DOCUMENTS

| | | | |
|---|---|---|---|
| 4,216,503 | 8/1980 | Wiggins | 358/213.16 |
| 4,314,281 | 2/1982 | Wiggins et al. | 358/163 |
| 4,534,059 | 8/1985 | Yamada | 358/461 |
| 4,590,520 | 5/1986 | Frame et al. | 358/163 |
| 4,601,058 | 7/1986 | Seto | 358/461 |
| 4,602,291 | 7/1986 | Temes | 358/213.16 |
| 4,628,352 | 12/1986 | Boue | 358/213.17 |
| 4,633,314 | 12/1986 | Kurata et al. | 358/461 |
| 4,639,781 | 1/1987 | Rucci et al. | 358/163 |
| 4,660,082 | 4/1987 | Tomohisa et al. | 358/163 |
| 4,698,685 | 10/1987 | Beaverson | 358/213.15 |
| 4,701,784 | 10/1987 | Matsuoka et al. | 358/213.17 |

Primary Examiner—James J. Groody
Assistant Examiner—Randall S. Svihla

[57] ABSTRACT

Method and apparatus to increase the range of correction of photosite offset and gain response. Each photosite is provided with a correction value for offset and gain response based on measured light intensity value, which is stored in memory. Each photosite correction value is also provided with an attribute value which indicates whether the correction values are to be used as stored, whether a shift of the values is appropriate, in accordance with a stored shift value, or whether the photosite is noncorrectable, and accordingly requires the implementation of a bad pixel routine. Depending on the attribute value, logic is enabled to vary the correction values in accordance with a stored routine for shifting the stored correction value, or implementing a bad pixel routine. If the attribute requires a shifted value, the correction value is shifted a number of places in accordance with a shift stored in the decoder, before it is applied. If the attribute indicates that the photosite response is not correctable, a bad pixel correction routine is enabled, to produce substitute data.

21 Claims, 3 Drawing Sheets

OFFSET, GAIN AND BAD PIXEL CORRECTION IN ELECTRONIC SCANNING ARRAYS

The present invention relates generally to a system for providing a wide range of correction for offset and gain in photosites, or providing bad pixel correction when the photosite output can not be corrected.

CROSS REFERENCE

Cross-reference is made to U.S. patent application Ser. No. 124,123, entitled "Address Token Based Image Manipulation", filed Nov. 23, 1987, and assigned to the same assignee as the present application.

INCORPORATION BY REFERENCE

The patents cited hereinafter are incorporated by reference. U.S. patent application Ser. No. 124,123, entitled "Address Token Based Image Manipulation", filed Nov. 23, 1987, and assigned to the same assignee as the present application is also specifically incorporated herein by reference.

BACKGROUND OF THE INVENTION

In electronic input scanners for document scanning, image information is acquired by sensing light from an image at any array of photosites arranged across a path of relative movement of the array and the image. The photosites, typically photodiodes or amorphous silicon sensors, are formed on a semiconductor substrate or chip, with a number of chips butted or arranged closely together to form the array. The photosite array may provide a 1:1 correspondence of photosites to the width of the actual image (a full width array), or may rely on optics to reduce the apparent image size to correspond to a smaller array. In use, a photosite produces an output signal proportional to light intensity detected at the photosite.

As the number of photosites in the imaging bar increases to provide a full width array or greater number of photosites, the problems of manufacturability of the larger arrays begin to become prominent. In a 300-600 spot per inch (spi) full width array for scanning documents, which may include 3000-6000+ photosites, even a manufacturing process that has a 99% yield can produce bad photosites along the array. Even when the photosites are not bad, the offset and gain response may be non-uniform across the array. To allow the use of arrays not meeting the required specifications for number of pad photosites or uniformity, correction of the array output is required. Accordingly, it may be seen that correction techniques are important to the economic manufacture of the arrays. Without correction techniques, arrays not meeting specifications in these areas would be discarded.

Responsivity at the photosites is measured against a standard value. Gain is a measure of sensitivity of the photosite to light and is the slope of the curve of light intensity (x-axis) versus output voltage (y-axis). Offset indicates the voltage output of the photosite at zero light intensity, or constitutes the y-axis intercept of the light intensity curve. These values have a tendency to vary somewhat from photosite to photosite within a range of values. Uniformity is desirable to avoid a streaking response.

U.S. Pat. No. 4,698,685 to Beaverson shows an arrangement which provides a gain correction for each pixel in an array. Gain values are stored for each pixel in an electronic storage device. As data is acquired by the array and directed to an image processor, each incoming pixel value is multiplied by a selected gain correction value to produce a gain corrected output. U.S. Pat. No. 4,639,781 to Rucci et al. shows that distortions in a video signal may be corrected by applying a continuous gain adjustment to the video information generated at the pixels and dynamically changing the gain factors on a line by line basis. U.S. Pat. No. 4,660,082 to Tomohisa et al., teaches that calibration and shading correction of image data may be corrected in synchronism with input scanning by comparison to a density reference value. U.S. Pat. No. 4,216,503 to Wiggins shows deriving offset and gain values from the sensor, storing those values and subsequently using those values for signal correction. U.S. Pat. No. 4,314,281 to Wiggins et al. teaches providing a compensation signal compensating for variations in light to which the sensors are subjected and deriving the compensation signal over a group of pixels, by taking an average response from the group as the group is exposed to a test pattern. U.S. Pat. No. 4,602,291 to Temes teaches a multimode pixel correction scheme which includes correction for pixel offset and gain.

U.S. Pat. No. 4,590,520 to Frame et al. and U.S. Pat. No. 4,314,281 to Wiggins et al. teaches correction of bad photosites (sometimes, "bad pixels") in an array of photosites by detecting the pixel information from the photosites and substituting the previous pixel value. U.S. Pat. No. 4,701,784 to Matsuoka et al. teaches correcting the bad pixel by calculating the correlation coefficient and selecting a substitute value for the bad pixel based on the calculated value.

SUMMARY OF THE INVENTION

In accordance with the invention there is provided a method and apparatus for a wide range of correction of photosite offset and gain. Each photosite is provided with a correction value for offset and gain based on measured light intensity value. Each photosite is also provided with an attribute value which indicates whether the correction values are to be used as stored, whether a shift of the values is appropriate, in accordance with a stored shift value, or whether the photosite is noncorrectable, and accordingly requires the implementation of a bad pixel routine.

In accordance with another aspect of the invention, the attribute value may be two bit binary value associated with the offset and gain correction values that provides four choices with respect to the photosite. The correction values are to be used (1) as stored, (2-3) first or second shift values may be applied, in accordance with a stored shift value, or (4) a bad pixel routine may be implemented.

In accordance with still another aspect of the invention, a correction arrangement implementing the described correction method includes a memory, storing for each photosite correction values for offset and gain, and an attribute value. When data is detected by that photosite, the correction values for that photosite will be applied, respectively, at an offset adder, and a gain multiplier. A decoder is used to detect the attribute value of the correction value. Depending on the attribute value, logic is enabled to vary the correction values in accordance with a stored routines for shifting the stored correction value, or implementing a bad pixel routine. If the attribute requires a shifted value, the correction value is shifted a number of places in accordance with a shift stored in the decoder, before it is applied. If the attribute indicates that the photosite response is not correctable, a bad pixel correction routine is enabled, to produce substitute data.

The magnitude of the correction value that can be applied to correct offset and gain is increased to provide an increased range of correction values. While the stored correction value may be a certain number of bits, all significant, the ability to shift that value effectively increases the stored correction by a factor corresponding to the number of shifted positions, to increase the correction range significantly.

In accordance with another aspect of the invention, in an arrangement in which correction values for correcting photosite response are stored, a distinctive value indicating a bad pixel may be stored as a correction value for a photosite. Detection of the distinctive value in the correction value indicates that a bad pixel routine should be implemented, substituting an approximated photosite response for an actual photosite response. This arrangement finds particular value when it is desirable not to indicate a bad pixel at the attribute value, where, for example four shift routines are desired, or only two shift routines are desired. In the latter instance, only a one bit attribute value will then be required.

These and other aspects of the invention will become apparent from the following description used to illustrate a preferred embodiment of the invention read in conjunction with the accompanying drawings in which:

FIG. 1 demonstrates a block diagram of an image information processing system wherein the present invention finds particular use;

Digital image information in the form of image data picture elements, (hereinafter, pixels), digital voltage representations of image intensity at discrete locations in an image, is provided from a suitable source. For example, the image data pixels may be obtained through line by line scanning of a image bearing original by one or more photosensitive imaging devices, such as an array of photosites. Image data pixels constitute the response of photosites indicating the intensity of light detected at the photosites over a given period. Line by line scanning of an image bearing original for the derivation of image information (image data pixels) is well known and does not form a part of the present invention.

Figure 1:
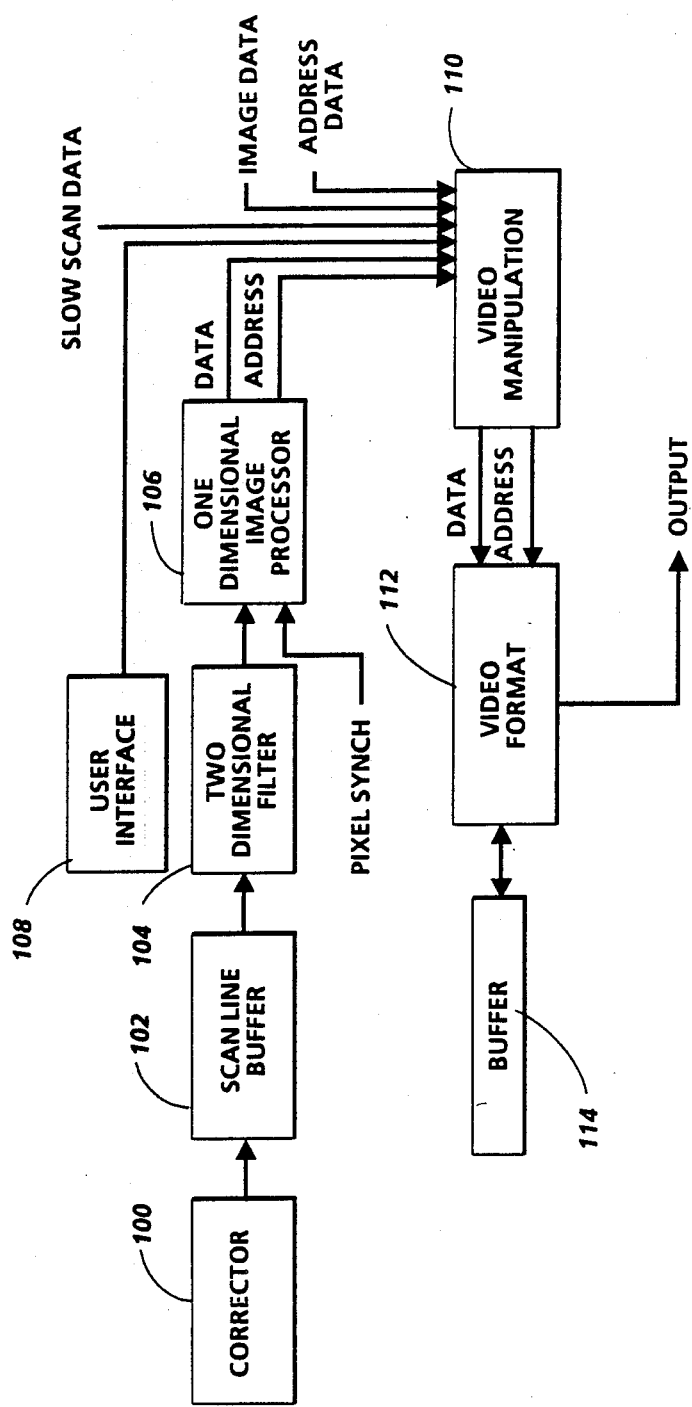

With reference now to the drawings where the showings are for the purpose of illustrating a preferred embodiment of the invention and not for limiting same, in an application incorporating the present invention, FIG. 1 shows an image processing arrangement in accordance with the present invention. In the described embodiment, image information or image data may be initially derived from an imaging device, typically comprising a scanning array (not shown) of photosensitive elements (photosites), which generate an analog signal response indicative of sensed light intensity in accordance with exposure to light imagewise reflected from an original document. When image information is produced from a scanning device, it might be produced along several channels, where each channel represents a portion of the scanning array from which image information is derived. Providing plural channels will allow parallel and faster processing of the image information. In a high density scanning array, which may have a length corresponding to the full width of a document to be scanned, several channels may be present, but for the purpose of explaining the present invention, only one channel will be illustrated.

Each channel directs image information, assumed to be converted at an analog to digital converter (not shown) functionally adjacent to the scanning array, from the analog signal initially derived from the scanning array to a digital signal, typically 9 bit data, into corrector 100 to output 8 bits of corrected data. As will be explained further below, at corrector 100, pixel data is normalized against a predetermined calibration to account for discrepancies in the sensitivity of each photosensitive element and correction algorithms account for bad photosensitive element locations in the array by various interpolation and bad pixel routines. Corrected pixel data is stored into scan line buffers 102, which stores a plurality of scan lines for operation by the two dimensional filter 104. Two dimensional filter 104 converts halftone screened pixel data into grey data for the prevention of moire effects. Because filtering routines useful in the conversion require information about the nearest neighbors to any particular pixel, scan line buffer 102 provides two dimensional filter 104 with pixel data for groups of adjacent scan lines. It will, of course, be appreciated that while the data line is illustrated as a single line, 8 bit data is transmitted from device to device along 8 parallel data transmission lines. One dimensional image processor 106 is provided for operation on the pixel data along each scan line and performs many common operations expected in image processing devices. User interface 108, causes a device controller (not shown), which may be a microprocessor driven device, responsive to operator commands and selection of functions, to enable processing function circuits for windowing and blanking, magnification and reduction or scaling, etc., in one dimensional image processor 106. A pixel synch is provided at one dimensional image processor 106 to provide an indication of which pixel data is being processed. Additionally, at one dimensional image processor, an address token is assigned to each pixel of pixel data, indicating its appropriate position in the data stream image. Pixel data is passed from one dimensional image processor 106 to video manipulation device 110. At this device, image manipulation desired by a user is applied to data to vary the information content or its position in the image data stream. Slow scan data information is provided to describe the position of the data in the slow scan direction. Manipulated data is directed to video formatting device 112 which, in combination with buffer 114, places image data appropriately in the output data stream in accordance with its address token.

Figure 2:
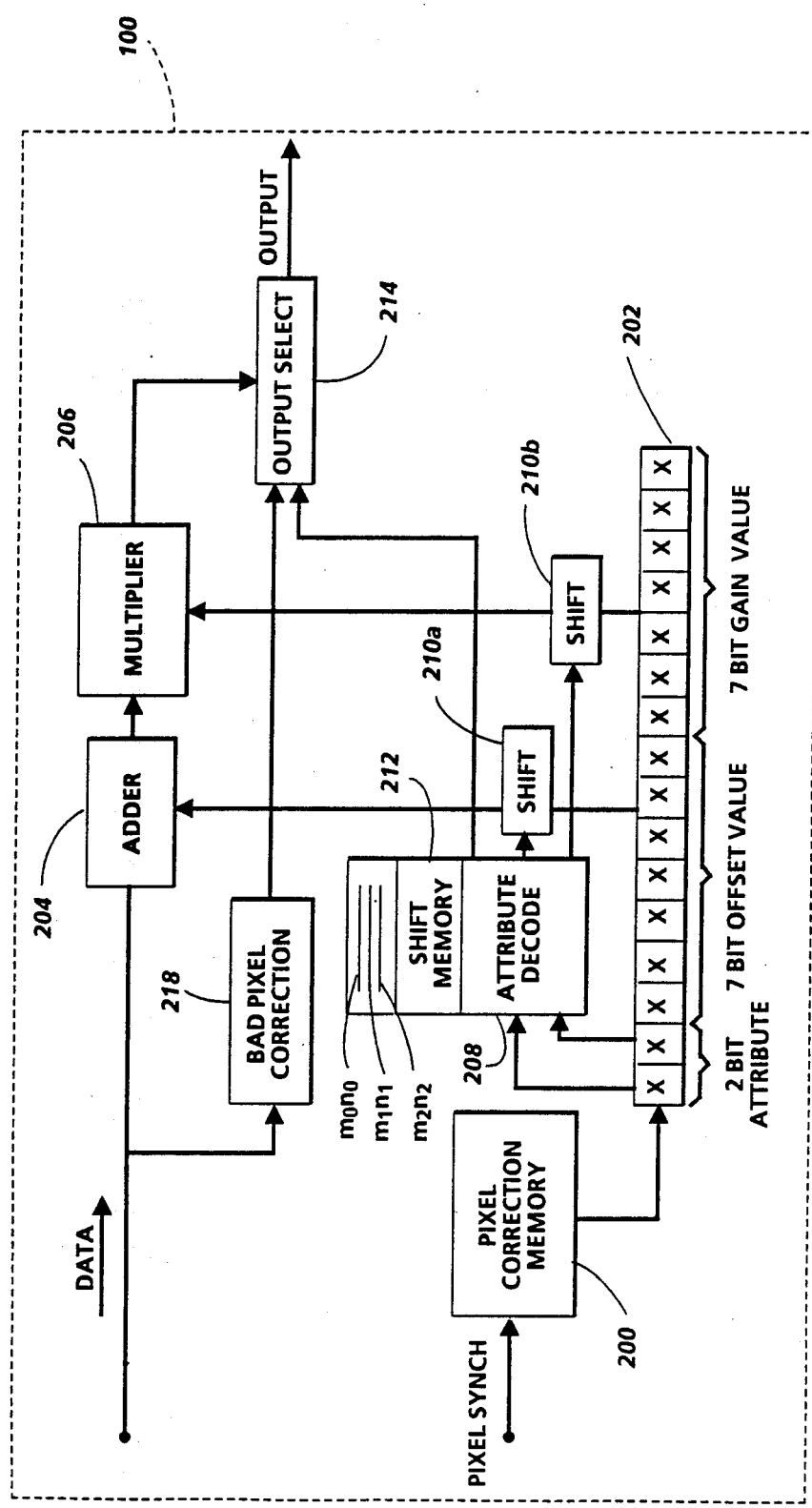
FIG. 2 is a block diagram illustrating the inventive corrector.

In accordance with the invention, and with reference to FIG. 2, corrector 100 is provided with a memory 200 which stores correction values to be applied to the pixel data. In common practice, this may be a RAM-type memory, suitable for first in-first out (FIFO) recall, which will hold an 8-16 bit correction value for each photosite along the array. Other types of memory are possible. When a pixel enters corrector 100, in accordance with the pixel synch directed to the memory 200, a sixteen bit correction value is stored in latch 202. In one possible format, the pixel information is stored with 7 bits for the gain correction value, 7 bits for the offset correction value, and two bits for an attribute value, although different formats may be used. The offset value stored in latch 202 will be added to the pixel data at adder 204, to correct the offset response of the photosite where the pixel originated. The pixel data will be multiplied in multiplier 206, with the gain correction stored in latch 202, to correct the photosite gain response. Prior to these corrections, however, the attribute portion of the correction value stored in latch 202 is read at attribute decoder 208. In accordance with the attribute value detected, which for example may be 00, 01, 10, or 11, the offset and gain correction values will be either applied as they are (right justified), or shifted a first or second number of places. Interposed between the latch 202, and adder 204 and multiplier 206, are shifters 210a and 210b, which shift the correction values stored in latch 202 a selectable number of places. Values for shift, i.e., how many places the correction values are shifted, can be stored in a shift memory 212 in registers, $m_0n_0$, $m_1n_1$, or $m_2n_2$ where $m_x$ is the offset shift and $n_x$ is the gain shift. One of the shift values, $m_0n_0$, may be zero indicating that no shift will occur. This value does not need to be stored, as it could easily be read by the decoder as a signal to disable the shifters. Shift memory may provide 8 bit storage, so that 4 bits each are available for offset shift $m_x$ and gain shift $n_x$. In accordance with the detected attribute value, the gain and offset values are shifted by the amounts stored in $m_xn_x$.

Given that offset may be expressed as $$p' = p - (\text{offset})$$

and that gain may be expressed as $$p'' = p'(1 + \text{gain})$$

where
p is the original pixel value;
p" is the offset corrected value;
pΔ is the gain corrected value; and
offset and gain are 7 bit numbers.

It can therefor be seen that if a 4 bit shift is available, it expands the range of correction values to $$p' = p - (2^n(\text{offset}))$$

and $$p'' = p'(1 + (2^n(\text{gain}))$$

If n=m=0, (that is, there is no shifting to occur) the available offset may be 25% of the range and the gain correction can be from 1.0 to 1.25. With a four bit value controlling the number of shifts that can be applied to the correction values, the stored offset and gain values may be varied by a factor of $2^{16}$, more than adequate for practical cases. Of course, it is not required that $m_x$ equal $n_x$.

When the attribute value encounters the fourth possible value provided in the attribute, a bad pixel is indicated. By a bad pixel, it is meant that the pixel cannot be corrected to obtain an appropriate or normalized response. Sensing the attribute for a bad pixel causes decoder 208 to enable the output selector 214 to substitute the bad pixel approximation derived at bad pixel correction device 216 for the data in the pixel information steam. Bad pixel correction device 216 may simply operate along the lines of U.S. Pat. No. 4,314,281 to Wiggins et al. by detecting the pixel information from the photosites and substituting the previous pixel value. Alternative bad pixel correction may take an average of nearest neighbor pixels to derive a substitute value.

Figure 3:
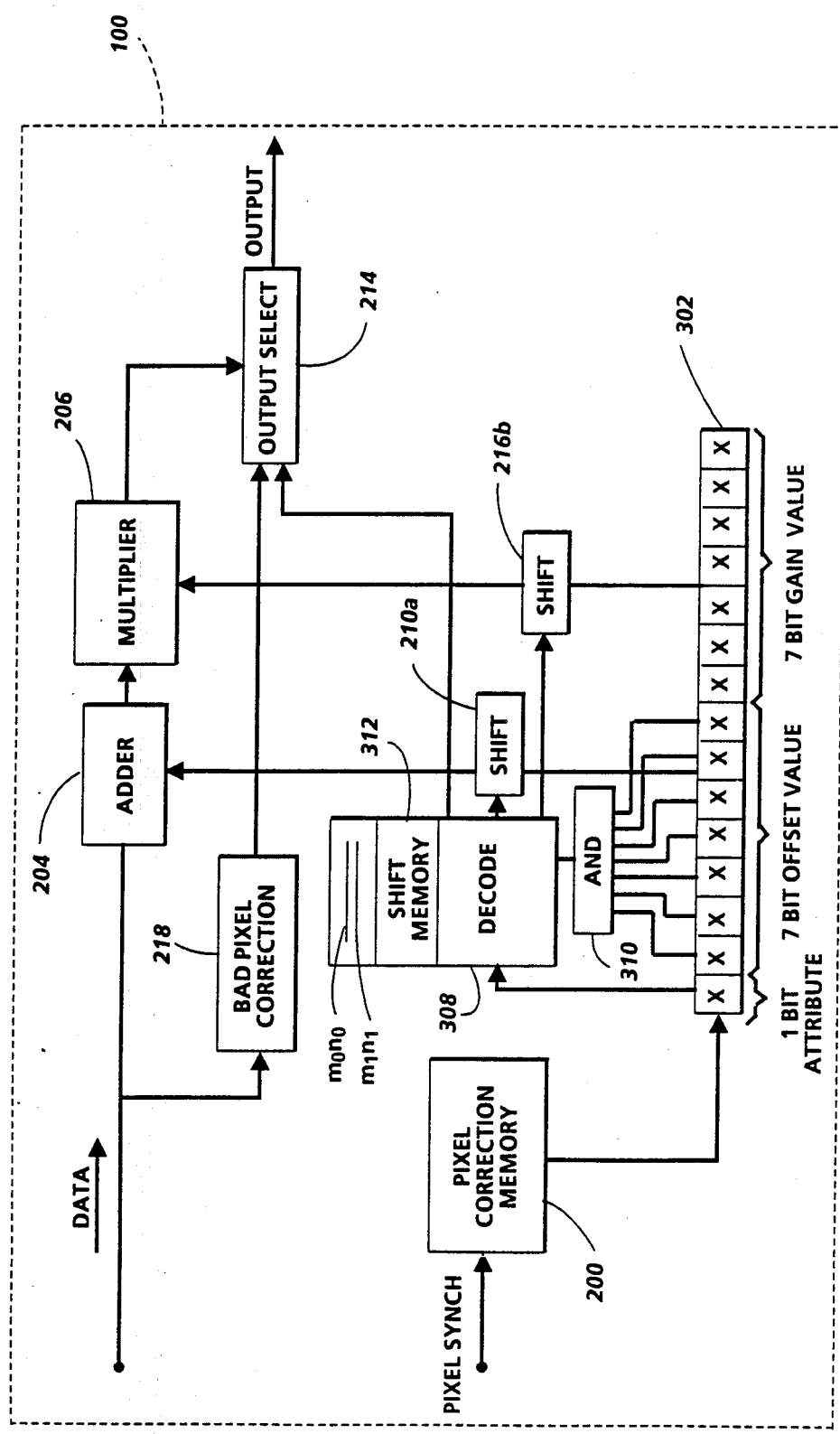
FIG. 3 is a block diagram illustrating another embodiment of the inventive corrector.

It will no doubt be appreciated that with the provision of the above general arrangement the invention may be varied in accordance with the needs of the device. Thus, for example, if only a single shift value is required to bring a number of pixels into the desired responsivity characteristics, one might use only a single bit for the attribute. This might provide one signal that would indicate no shift and another signal that provides a value as a shift. Bad pixel indications can be loaded as a data for a correction value in memory 200, as an unusual correction value, perhaps every bit equaling one. A data signal of this value could be read a bad pixel. Thus, as shown for example in FIG. 3, the correction value for a bad pixel in the array would have a distinctive value associated with it, perhaps 7 of the 14 correction bits equaling one,i.e. the offset correction value has all ones. When this event occurs an AND gate 310 with 7 inputs connected to each of 7 bits of latch 302, would produce an appropriate response signaling the occurrence of a bad pixel when all 7 bits equal one. A one bit attribute value might be provided at the correction value stored in memory 200 to indicate either a shift or no shift. Shift memory 312 is therefore required to store only a single shift value (or two shift values, one of which may equal a zero or no shift). It will be recognized that the desirability of such an arrangement is in the reduction of memory size required for the storage of correction values. Of course, a two bit attribute value could be maintained, thus allowing a selection of four shift choices.

The same device as proposed could be used in a configurations not requiring variable shifting, by simply loading fixed values in the shift memory. Bad pixels again can be indicated from the data stored in memory 200. Thus, no attribute value would be necessary and the size of the pixel correction memory can be reduced, if the photosite array met these requirements, even though the same device is used.

It will be recognized that while the invention has been described for correcting both gain and offset, either one could also be corrected independently if the offset or gain of the device is satisfactory as manufactured. Bad pixel correction may also be corrected independently from this arrangement, or not at all.

The invention has been described with reference to a preferred embodiment. Obviously modifications will occur to others upon reading and understanding the specification taken together with the drawings. This embodiment is but one example, and various alternatives, modifications, variations or improvements may be made by those skilled in the art from this teaching which are intended to be encompassed by the following claims.

We claim:
1. An image scanning device having a scanning array with a plurality of photosites detecting light from an image, each photosite producing a response indicative of light intensity, and including means for correction of responsivity of the photosites, comprising:
a memory storing correction values for photosites along the array;
correction means for applying said correction values to the responses from the photosites;
said correction values each including a correction portion and an attribute value;

means to apply said correction portions to the photosite responses;

a decoder for detecting said attribute values;

shift means for shifting said correction portions prior to application to the photosite responses by a selected number of places, said shift means responsive to detection by said decoder of attribute values indicating that shifting should occur.

2. The device as defined in claim 1 wherein each said attribute value has one of a limited number of different values, each different value indicating a different shift to be applied to said shift means.

3. The device as defined in claim 1 and including means for substituting an approximated response for the actual response from a particular photosite.

4. The device as defined in claim 3 wherein said means for substituting an approximated response for the actual response from a particular photosite is responsive to detection by said decoder of attribute values indicating that said substitution should occur.

5. An image scanning device having a scanning array with a plurality of photosites detecting light from an image, each photosite producing a response indicative of light intensity, and including means for correction of responsivity of the photosites, comprising:

a memory storing correction values for photosites along the array;

said correction values each including an offset correction, a gain correction and an attribute value;

offset correcting means for correcting the offsets of the photosite responses in accordance with the stored offset corrections;

gain correcting means for correcting the gains of the photosite responses in accordance with the stored gain corrections;

a decoder for detecting the attribute values;

shift means for shifting said offset corrections and said gain corrections prior to the application thereof to said photosite responses, by a selected number of places, said shift means responsive to detection by the decoder of attribute values indicating that shifting should occur.

6. The device as defined in claim 5 wherein each said attribute value indicates one of a plurality of shift functions, each shift function stored in a memory for use by said shift means.

7. The device as defined in claim 6 wherein each said correction value is a multi bit binary value, including a first number of bits for the gain correction, a second number of bits for the offset correction and a third number of bits for the attribute value.

8. The device as defined in claim 7 wherein said third number of bits for the attribute value is equal to two bits, providing a total of four choices for the attribute value.

9. The device as defined in claim 5 and including means for substituting an approximated response for the actual response from a particular photosite.

10. The device as defined in claim 9 wherein said means for substituting an approximated response for the actual response from a particular photosite is responsive to detection by said decoder of attribute values indicating that said substitution should occur.

11. The device as defined in claim 10 wherein each said correction value is a multi bit binary value, including a first number of bits for the gain correction, a second number of bits for the offset correction and a third number of bits for the attribute value.

12. The device as defined in claim 11 wherein said third number of bits for the attribute value is equal to two bits, providing a total of four choices for the attribute value.

13. The device as defined in claim 12 wherein for the possible choices for the attribute value, a first value indicates that the gain and offset correction should be shifted by 0 places, second and third values indicate that said gain and offset correction should be shifted selected numbers of places respectively, and a fourth value indicates that an approximated photosite response should be substituted for the actual photosite response.

14. A method of correcting the responsivity of photosites in an image scanning device having a scanning array with a plurality of photosites detecting light from an image, each photosite producing a response indicative of light intensity, said method comprising the steps:

storing correction values for correction of the responses of photosites along the array in a memory;

providing each said correction value with an attribute value;

for each photosite response to be corrected, sensing said attribute value;

applying a predetermined shift function to said correction value responsive to said attribute value to derive a new correction value; and applying said new correction value to said photosite response to be corrected.

15. The method as defined in claim 14 wherein said attribute value is selected from a limited number of values, indicating a choice of predetermined shift functions to be applied.

16. The device as defined in claim 14 and including the step of substituting an approximated response for the actual response from the photosite response to be corrected, responsive to sensing an attribute value indicating that said substitution should occur.

17. A method of correcting the responsivity of photosites in an image scanning device having a scanning array with a plurality of photosites detecting light from an image, each photosite producing a response indicative of light intensity, said method comprising the steps:

storing correction values for correction of offset and gain of photosite responses along the array in a memory;

providing each said correction value with an attribute value, said attribute value having one of a limited number of different values, each different value indicating that a different particular function is to be performed;

for each photosite response to be corrected, automatically selecting one of the different functions in response to detection of the attribute value, at least one of said different functions applying a shift function to said offset and gain correction values to derive new correction values; and applying said new offset and gain correction values value to said photosite response to be corrected.

18. The method as defined in claim 17 wherein at least one of said different functions represented by said attribute value indicates that substitution of an approximated response for the actual response from a particular photosite, should be performed; and substituting an approximated response for the actual response from the photosite response to be corrected.

19. A method of correcting the responsivity of photosites in an image scanning device having a scanning array with a plurality of photosites detecting light from an image, each photosite producing a response indicative of light intensity, said method comprising the steps:

storing binary values for correction of offset and gain of photosite responses along the array in a

20. A method of correcting the responsivity of photosites in an image scanning device having a scanning array with a plurality of photosites detecting light from an image, each photosite producing a response indicative of light intensity, said method comprising:

for each photosite response correctable to a normalized value, storing a correction value in a correction memory to be applied to the photosite response for correction thereof;

said correction value including an attribute value, indicating that a shift function should be applied to said correction value prior to application thereof to the photosite response;

for each photosite response not correctable to a normalized value, storing a distinctive value in said correction memory indicating that an approximated photosite response should be substituted for the actual photosite response;

detecting each said attribute value and enabling a shift function to be applied to the associated correction value in response to the attribute value detected to derive a new correction value;

detecting each said distinctive value and enabling a photosite response approximation function to produce an approximated photosite response;

applying each new correction value to the associated photosite response to correct said photosite response to a normalized value;

substituting each approximated photosite response for the associated actual photosite response not correctable to a normalized value.

21. A method of correcting the responsivity of photosites in an image scanning device having a scanning array with a plurality of photosites detecting light from an image, each photosite producing a response indicative of light intensity, said method comprising:

for each photosite response correctable to a normalized value, storing a correction value in a correction memory to be applied to the photosite response for correction thereof;

for each photosite response not correctable to a normalized value, storing a distinctive value in said correction memory indicating that an approximated photosite response should be substituted for the actual photosite response;

detecting each said distinctive value and enabling a photosite response approximation function to produce an approximated photosite response;

applying each correction value to the associated photosite response to correct said photosite response to a normalized value;

substituting each approximated photosite response for the associated actual photosite response not correctable to a normalized value.

* * * * *